April 7, 1953     T. F. CARMICHAEL     2,634,404
PHASE INDICATOR
Filed Jan. 23, 1952
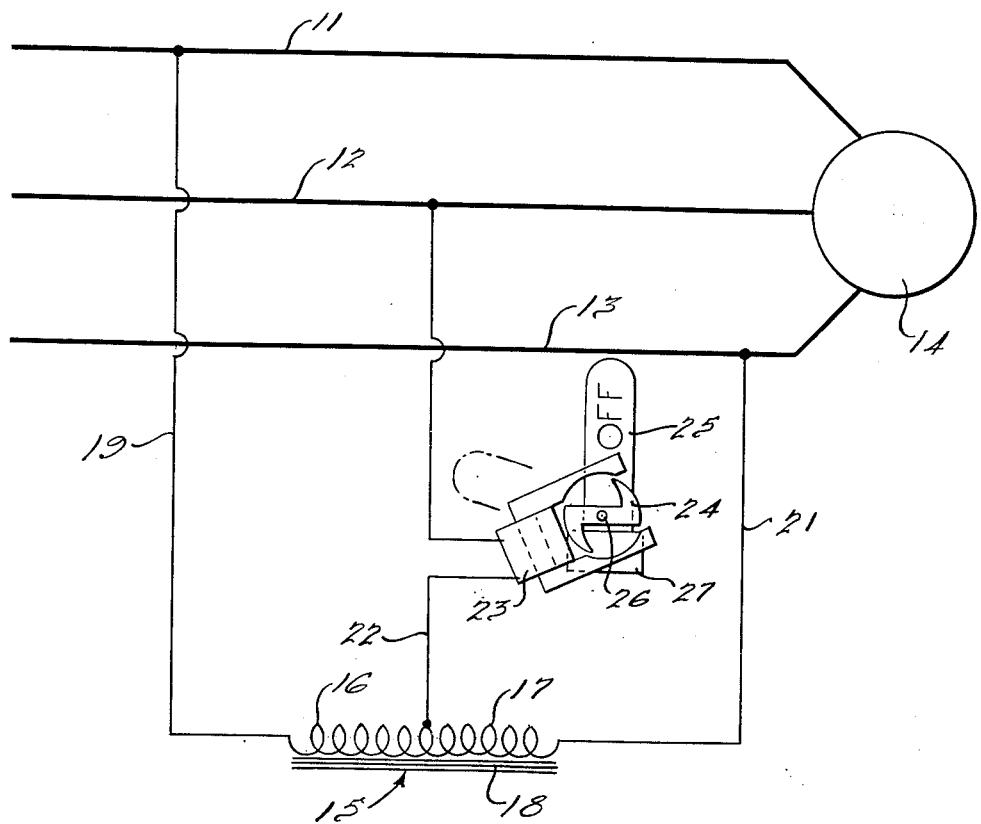
INVENTOR.
Thomas Frazer Carmichael.
BY
Harness, Dickey & Pierce
ATTORNEYS.

Patented Apr. 7, 1953

2,634,404

UNITED STATES PATENT OFFICE 2,634,404

PHASE INDICATOR

Thomas Frazer Carmichael, Plymouth, Mich., assignor to Syncro Corporation, Oxford, Mich., a corporation of Michigan Application January 23, 1952, Serial No. 267,874

5 Claims. (Cl. 340—253)

1

This invention relates to phase indicators, and more particularly to apparatus for indicating a disconnected phase in a three-phase circuit.

The need for an indicator to show disconnection of one phase in a three-phase circuit is apparent, since it is highly undesirable to operate apparatus from a single-phase source when the apparatus is designed for polyphase operation.

Devices are known for indicating a disconnected phase in a three-phase circuit, but these devices are relatively complicated in nature and are adatped for use only in particular circuits.

It is an object of the present invention to provide an improved phase indicator which is of relatively simple construction and versatile in application, and will operate effectively to indicate the disconnection of one or more phases in a polyphase circuit.

It is another object to provide an improved phase indicator of the above character which uses a single mechanism to indicate the failure of any phase and in which the mechanism is itself operable by a single-phase source.

It is a further object to provide an improved phase indicator as aforesaid which incorporates an electromagnetically operated flag or similar member as the indicating element and in which this flag is capable of a relatively large displacement upon disconnection of a phase.

Other objects, features, and advantages of the present invention will become apparent from the subsequent description taken in conjunction with the accompanying drawing.

In the drawing:

The single figure of the drawing is a diagram illustrating the phase indicator in a three-phase circuit.

Referring more particularly to the drawing, a three-phase power supply having lines 11, 12 and 13 is shown as being connected to a load 14. The load is assumed to be of a balanced type, although, as will be explained later, the invention would also be operative even with a certain degree of initial unbalance in the circuit. The novel phase indicator of the invention comprises an inductive unit generally indicated at 15 which has two connected coil parts 16 and 17 mutually coupled by a magnetic path 18. This unit is connected between any two phases and in the illustrated embodiment is connected between lines 11 and 13 by leads 19 and 21. The unit has a tap 22, shown as a center tap in the illustrated embodiment, leading to the third line 12 of the three-phase supply. Interposed in tap 22 is a flag coil 23 which is magnetically isolated from unit 15. Flag coil 23 is adapted to operate a rotary core 24 which in turn is connected to an indicator flag 25 on a common pivot 26, the flag being provided with a counterweight 27. The rotary-type solenoid employed permits a large angular displacement of the flag which is advantageous in

2 certain installations. However, it will be understood that other types of flag actuators could be used.

In order to understand the operation of the improved phase indicator, the properties of the center-tapped coil 15 under different conditions should be examined. It is well known that considering load currents, the instantaneous ampere turns in both ends of such a coil must be the same and that therefore the instantaneous load currents in the two halves of a center-tapped coil are always equal and opposite. Since a relatively low impedance is encountered when current flows in opposite directions through the closely coupled end portions of a center-tapped coil, the magnitude of current through the coil will be relatively high. On the other hand, current flowing in the same direction through all portions of a coil will encounter high impedance, and such currents will therefore be of a relatively small magnitude.

Bearing these facts in mind, the operation of the phase indicator will be readily apparent. When all three lines 11, 12 and 13 are connected to a three-phase power source, the inductive unit 15 will have somewhat of a transformer action, the load currents in its two closely coupled coil parts 16 and 17 being at any instant equal in magnitude and in opposite directions. The unit will therefore offer relatively low impedance, and sufficient current will flow through the center tap 22 and flag coil 23 to hold core 24 in its counterclockwise position and therefore flag 25 in its dot-dash line position. This will be an indication that all three phases are properly energized.

Let us assume that line 11 becomes disconnected from its power source. The remaining two lines 12 and 13 will continue to supply single-phase current to the load 14, a condition which is undesirable. Since coil part 17 of the inductive unit 15 is connected across lines 12 and 13 through lead 21 and center tap 22, this coil will tend to carry current between these two lines. However, the inductive unit will no longer act as a center-tapped transformer since coil part 16 is connected to line 11 which has been disconnected. Coil part 17 will therefore act somewhat as a choke coil with high impedance characteristics. This in turn will permit relatively little current to flow through flag coil 23, and the construction is such that coil 23 will no longer be capable of holding core 24 in its counterclockwise position. The counterweight 27 will therefore swing the flag and core to their solid-line position, indicating the disconnection of a phase.

Although the operation has been described only for a situation where line 11 is disconnected, it will be apparent that the device will also operate when either of lines 12 or 13 is disconnected. The operation when line 13 is disconnected will be exactly the same as where line 11 is disconnected, with the exception that coil part 16 rather than coil part 17 acts as the high impedance coil, reducing the current in flag coil 24. With line 12 disconnected, it will be apparent that a single-phase supply will exist between remaining lines 11 and 13, so that coil parts 16 and 17 together act as a unitary high impedance coil. Like the previous cases, this will reduce the current in flag coil 24, allowing flag 25 to move to its solid-line or phase disconnect position. With two or more lines disconnected, the flag coil will obviously be de-energized, since no supply current can flow.

Although the device has been illustrated as embodied in a three-phase system, it will be apparent that it could as well be embodied in other polyphase systems such as a two-phase three-wire system. In such a case the center tap 22 with the flag coil 24 would be connected to the neutral wire. It is also obvious that the flag 25 could be replaced by another element, such as one exercising a control function when moved between its limiting positions.

The word "indicator" is therefore to be considered as used in its generic sense and refers to other types of elements as well as those actually performing an indicating function.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In a device of the class described, an inductive unit having two electrically connected and mutually coupled coil parts connected between two phase lines, a tap leading from said inductive unit to a third line, an element operable to either a normal or a disconnect condition, and means in said tap for operating said element, the current flowing through said tap being operative to cause said element to be actuated to a normal condition when all the phase lines are energized, disconnection of any of said phase lines causing a substantial decrease in the magnitude of current flowing through said tap, whereby said element will be actuated to a disconnect condition.

2. In a phase indicator for indicating the disconnection of one or more phases in a polyphase circuit, an inductive unit having two electrically connected and mutually coupled coil parts, means connecting the ends of said inductive unit between two phase lines, a tap connecting said inductive unit to a third phase line, said inductive unit exhibiting a relatively low impedance when all of said phase lines are connected, the energized portion of said inductive unit exhibiting a relatively high impedance when one of said lines is disconnected, an indicator operative to indicate either a normal condition or a disconnect condition, and electromagnetic means in said tap operatively connected to said indicator, the current flow through said electromagnetic means being sufficient to ause said indicator to indicate a normal condition when all of said phase lines are energized, disconnection of any of said phase lines causing a sufficient decrease of current in said electromagnetic means to cause said indicator to indicate a disconnect condition.

3. In a phase indicator for indicating the disconnection of one or more phases in a polyphase circuit, an inductive unit having two substantially identical electrically connected and mutually coupled coil parts, means connecting the ends of said inductive unit between two phase lines, a tap connecting the juncture of said coil parts to a third phase line, said inductive unit exhibiting a relatively low impedance when all of said phase lines are connected, the energized portion of said inductive unit exhibiting a relatively high impedance when one of said lines is disconnected, an indicator movable between a position indicating a normal condition and a position indicating a disconnect condition, and electromagnetic means in said tap and operatively connected to said indicator, the current in said tap being sufficient to hold said indicator in its normal position when all of said phase lines are connected, disconnection of any phase line causing a sufficient reduction of current flow in said tap to cause said indicator to move to its disconnect position.

4. In a device of the class described, an inductive unit having two electrically connected and mutually coupled coil parts, means connecting the ends of said inductive unit between two phase lines, a tap connecting said inductive unit to a third phase line, said inductive unit exhibiting a relatively low impedance when all of said phase lines are connected, the energized portion of said inductive unit exhibiting a relatively high impedance when one of said lines is disconnected, an element movable between two positions, and electromagnetic means in said tap operatively connected to said element, the current flow through said electromagnetic means being sufficient to hold said element in one of said positions when all of said phase lines are energized, disconnection of any of said phase lines causing a sufficient decrease in current in said electromagnetic means to cause said element to move to said other position.

5. In a phase indicator for indicating the disconnection of one or more phases in a polyphase circuit, an inductive unit having two electrically connected and mutually coupled coil parts, means connecting the ends of said inductive unit between two phase lines, a tap connecting said inductive unit to a third phase line, said inductive unit exhibiting a relatively low impedance when all of said phase lines are connected, the energized portion of said inductive unit exhibiting a relatively high impedance when one of said lines is disconnected, an indicator swingable between a normal position and a disconnect position, a rotary solenoid for swinging said indicator, and electromagnetic means in said tap and operatively connected to said solenoid, the current flow through said electromagnetic means being sufficient to cause said indicator to indicate a normal condition when all of said phase lines are energized, disconnection of any of said phase lines causing a sufficient decrease of current in said electromagnetic means to cause said indicator to indicate a disconnect condition.

THOMAS FRAZER CARMICHAEL.

REFERENCES CITED

The following references are of record in the file of this patent:

UNITED STATES PATENTS

| Number | Name | Date |
|---|---|---|
| 1,784,546 | Schleicher | Dec. 9, 1930 |
| 2,354,902 | Wolferz | Aug. 1, 1944 |